US010178531B2

(12) United States Patent
Nguyen et al.

(10) Patent No.: US 10,178,531 B2
(45) Date of Patent: Jan. 8, 2019

(54) METHODS AND APPARATUS FOR EFFICIENT SENSOR DATA SHARING IN A VEHICLE-TO-VEHICLE (V2V) NETWORK

(71) Applicant: QUALCOMM Incorporated, San Diego, CA (US)

(72) Inventors: Tien Viet Nguyen, Bridgewater, NJ (US); Libin Jiang, Bridgewater, NJ (US); Zhibin Wu, Bedminster, NJ (US); Kapil Gulati, Franklin Park, NJ (US); Sudhir Baghel, Bridgewater, NJ (US); Shailesh Patil, Raritan, NJ (US); Durga Prasad Malladi, San Diego, CA (US); Junyi Li, Chester, NJ (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/623,250

(22) Filed: Jun. 14, 2017

(65) Prior Publication Data

US 2018/0077518 A1     Mar. 15, 2018

Related U.S. Application Data

(60) Provisional application No. 62/395,350, filed on Sep. 15, 2016.

(51) Int. Cl.
*G07C 5/00* (2006.01)
*H04W 4/70* (2018.01)
(Continued)

(52) U.S. Cl.
CPC ............ *H04W 4/70* (2018.02); *G08G 5/0008* (2013.01); *G08G 5/0013* (2013.01);
(Continued)

(58) Field of Classification Search
CPC ... B60W 2050/0077; B60W 2050/146; B60W 2550/10; B60W 2550/40; B60W 2550/408; B60W 30/00; B60W 30/0956; B60W 30/10; B60W 40/04; B60W 50/14
USPC ............ 455/41.1, 41.2, 522, 69, 3.03, 3.06, 455/414.1, 420, 13.1, 512, 67.11, 556.1, 455/99, 297; 701/300, 423; 370/347,
(Continued)

(56) References Cited

U.S. PATENT DOCUMENTS

| 9,036,509 | B1 * | 5/2015 | Addepalli | ............. | H04W 4/046 |
| | | | | | 370/259 |
| 2009/0309757 | A1 * | 12/2009 | Mudalige | ............... | G08G 1/161 |
| | | | | | 340/905 |

(Continued)

OTHER PUBLICATIONS

International Search Report and Written Opinion—PCT/US2017/049967—ISA/EPO—Dec. 7, 2017.

*Primary Examiner* — Tan H Trinh
(74) *Attorney, Agent, or Firm* — Loza & Loza, LLP

(57) ABSTRACT

Various aspects of the present disclosure relate to vehicle-to-vehicle (V2V) data sharing. The sensor data collected from each vehicle may be divided into common information and detailed information. The common information is broadcasted to every other nearby vehicle. Based on the received common information other vehicles may express interest in some particular detailed information. Unicast and/or multicast sessions may be set up to share the detailed information with the interested vehicles.

28 Claims, 10 Drawing Sheets

(51) Int. Cl.
*G08G 5/00* (2006.01)
*H04W 84/00* (2009.01)
*H04B 7/0413* (2017.01)
*H04W 4/06* (2009.01)
*B60W 50/00* (2006.01)

(52) U.S. Cl.
CPC ...... *H04W 84/00* (2013.01); *B60W 2050/008* (2013.01); *H04B 7/0413* (2013.01); *H04W 4/06* (2013.01)

(58) Field of Classification Search
USPC .............. 370/252, 328, 329, 312, 474, 476; 340/905, 936, 937, 933, 934; 709/213, 709/206
See application file for complete search history.

(56) References Cited

U.S. PATENT DOCUMENTS

| | | | | |
|---|---|---|---|---|
| 2012/0209510 A1* | 8/2012 | Ikawa | ............... | G01C 21/3492 701/423 |
| 2013/0103781 A1* | 4/2013 | Mori | ............... | H04L 1/0084 709/213 |
| 2013/0279392 A1* | 10/2013 | Rubin | ............... | H04W 72/005 370/312 |
| 2013/0279393 A1* | 10/2013 | Rubin | ............... | H04J 3/1694 370/312 |
| 2013/0279491 A1* | 10/2013 | Rubin | ............... | G08G 1/166 370/347 |
| 2014/0038668 A1* | 2/2014 | Vasavada | ............... | H04L 65/4061 455/556.1 |
| 2014/0056229 A1* | 2/2014 | Li | ............... | H04W 8/186 370/329 |
| 2014/0146795 A1* | 5/2014 | Tian | ............... | H04W 68/02 370/336 |
| 2014/0153417 A1* | 6/2014 | Gupta | ............... | H04W 52/0219 370/252 |
| 2014/0278045 A1* | 9/2014 | Cheng | ............... | B60W 30/00 701/300 |
| 2014/0302774 A1* | 10/2014 | Burke | ............... | H04H 20/57 455/3.05 |
| 2014/0310103 A1* | 10/2014 | Ricci | ............... | B60Q 1/00 705/14.62 |
| 2014/0359035 A1* | 12/2014 | Wang | ............... | H04L 51/06 709/206 |
| 2015/0003473 A1* | 1/2015 | Park | ............... | H04L 1/0006 370/474 |
| 2015/0139197 A1* | 5/2015 | He | ............... | H04W 4/70 370/336 |
| 2015/0220991 A1* | 8/2015 | Butts | ............... | G06Q 30/0265 705/14.62 |
| 2015/0263771 A1* | 9/2015 | Bakhri | ............... | H04W 4/046 455/200.1 |
| 2015/0288636 A1* | 10/2015 | Yalavarty | ............... | H04L 51/16 709/206 |
| 2015/0289123 A1* | 10/2015 | Shatzkamer | ............... | G06Q 10/06 455/406 |
| 2015/0353008 A1* | 12/2015 | Kline | ............... | B60W 40/04 340/993 |
| 2015/0381751 A1* | 12/2015 | Haran | ............... | H04L 67/28 709/217 |
| 2016/0063761 A1* | 3/2016 | Sisbot | ............... | B60W 50/14 345/633 |
| 2016/0189146 A1* | 6/2016 | Cattone | ............... | G06Q 20/3829 705/71 |
| 2016/0353313 A1* | 12/2016 | Reyes | ............... | H04W 4/70 |
| 2016/0357188 A1* | 12/2016 | Ansari | ............... | G05D 1/0212 |
| 2017/0017734 A1* | 1/2017 | Groh | ............... | G06F 17/5009 |
| 2017/0032402 A1* | 2/2017 | Patsiokas | ............... | G06Q 30/0266 |
| 2017/0066374 A1* | 3/2017 | Hoye | ............... | G08B 21/06 |
| 2017/0105104 A1* | 4/2017 | Ulmansky | ............... | H04W 4/70 |
| 2017/0113664 A1* | 4/2017 | Nix | ............... | B60T 7/12 |
| 2017/0126569 A1* | 5/2017 | Seed | ............... | H04W 4/70 |
| 2017/0150330 A1* | 5/2017 | Kim | ............... | H04W 4/90 |
| 2017/0169625 A1* | 6/2017 | Lavie | ............... | G07C 5/008 |
| 2017/0171690 A1* | 6/2017 | Kim | ............... | H04W 4/70 |
| 2017/0230919 A1* | 8/2017 | Siomina | ............... | H04W 52/383 |
| 2017/0236423 A1* | 8/2017 | Bowers | ............... | G08G 1/166 340/903 |
| 2017/0243485 A1* | 8/2017 | Rubin | ............... | G08G 1/096791 |
| 2017/0287233 A1* | 10/2017 | Nix | ............... | G07C 5/008 |
| 2017/0303238 A1* | 10/2017 | Fodor | ............... | H04W 72/02 |
| 2017/0345228 A1* | 11/2017 | Dibb | ............... | G07C 5/008 |
| 2017/0345297 A1* | 11/2017 | Umehara | ............... | G08G 1/09 |
| 2017/0358204 A1* | 12/2017 | Modica | ............... | G08G 1/0112 |
| 2018/0024569 A1* | 1/2018 | Branson | ............... | G05D 1/0257 701/23 |
| 2018/0025630 A1* | 1/2018 | Matsumoto | ............... | G08G 1/0112 |
| 2018/0049219 A1* | 2/2018 | Gupta | ............... | H04W 72/1247 |
| 2018/0068206 A1* | 3/2018 | Pollach | ............... | G06K 9/00791 |
| 2018/0090009 A1* | 3/2018 | Roessler | ............... | H04W 4/70 |
| 2018/0095465 A1* | 4/2018 | Gao | ............... | B62D 15/0265 |
| 2018/0160333 A1* | 6/2018 | Patil | ............... | H04W 4/46 |
| 2018/0175953 A1* | 6/2018 | Rao | ............... | H04W 4/44 |

* cited by examiner

METHODS AND APPARATUS FOR EFFICIENT SENSOR DATA SHARING IN A VEHICLE-TO-VEHICLE (V2V) NETWORK

PRIORITY CLAIM

This application claims priority to and the benefit of provisional patent application No. 62/395,350 filed in the United States Patent and Trademark Office on 15 Sep. 2016, the entire content of which is incorporated herein by reference as if fully set forth below in its entirety and for all applicable purposes.

TECHNICAL FIELD

The present disclosure relates generally to wireless communication systems, and more particularly, to efficient sensor data sharing in a vehicle-to-vehicle (V2V) network.

INTRODUCTION

Vehicles today are being developed to incorporate and utilize various sensor data to improve performance, drivability, and safety. This sensor data may include inertial sensor readings, radar, Lidar, high-definition (HD) video streams captured from on-board cameras, as well as satellite-based navigation data, and mobile communication system information. Such sensor information may be of use to nearby vehicles and may improve safety when shared among the vehicles.

Many vehicles may be linked as a node to a variety of wireless communication systems. In wireless communication systems, a network may include a number of nodes, such as mobile devices or user equipment (UE) and base stations, node Bs, evolved node Bs (eNBs), gNBs, road side units (RSUs), or other similar devices that support wireless communication for the UEs. In conventional cellular communication, UEs may communicate with a base station via forward or downlink channels (i.e., the communication link from the base station to the UE) and reverse or uplink channels (i.e., the communication link from the UE to the base station). Additionally, UEs may communicate directly with one another in device-to-device (D2D), peer-to-peer (P2P), or mesh links. Some examples of these D2D or P2P communication schemes may be known to those skilled in the art as sidelink communication.

In general, sidelink channels may be established between devices using one of two different modes of operation. In the first mode, the base station schedules the UEs, and grants sidelink resources for respective UEs to utilize for D2D or sidelink communication. This first mode may frequently be employed where a sidelink utilizes a licensed band (including, but not necessarily limited to the same band as the uplink and downlink channels) for D2D communication. In the second mode, UEs may communicate directly with one another without scheduling or supervision by a base station or scheduling entity. This second mode may frequently be employed where a sidelink utilizes an unlicensed band for D2D communication. Here, the unlicensed band may include contention-based resources, and devices may employ various techniques such as listen-before-talk to access the sidelink channel.

Recently, automobiles, trailer trucks, and other vehicles are being designed to include advanced antenna systems that enable the vehicles to operate in such wireless communication systems (conventional cellular, D2D, or otherwise). These wireless communication capabilities can provide a vehicle with many new functions and capabilities that were previously unavailable, such as real-time navigation, assisted driving, safety warnings, traffic information, accident avoidance, etc. Currently, substantial research and development is being devoted to enable fully automated driving, which relies heavily on the vehicle having wireless communication capabilities. As these capabilities continue to increase and improve, and the amount and variety of information wirelessly transmitted to and from a vehicle continues to grow, the wireless communication technology to support these changes also continues to advance.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to vehicle-to-vehicle (V2V) communication and data sharing. The sensor data collected from each vehicle may be divided into common information and detailed information. The common information is broadcasted to every other nearby vehicle and indicates the availability the detailed information. Based on the received common information, other vehicles may express interest in some particular detailed information. Unicast and/or multicast sessions may be set up to share the detailed information with the interested vehicles.

One aspect of the present disclosure provides a method for vehicle-to-vehicle communication. A vehicle receives sensor data from one or more sensors, and categorizes the sensor data into common information and detailed information. The vehicle broadcasts the common information to at least one other vehicle in a vehicle-to-vehicle (V2V) network. The common information indicates the availability of the detailed information. The vehicle determines that at least one portion of the detailed information is desired by the at least one other vehicle, and transmits the at least one portion of the detailed information to the at least one vehicle.

Another aspect of the present disclosure provides an apparatus for vehicle-to-vehicle communication. The apparatus includes at least one processor, at least one transceiver communicatively coupled to the at least one processor, and a memory communicatively coupled to the at least one processor. The at least one processor and the memory are configured to receive sensor data from one or more sensors and categorize the sensor data into common information and detailed information. The at least one processor and the memory are configured to broadcast the common information to at least one other vehicle in a vehicle-to-vehicle (V2V) network, and the common information indicates the availability of the detailed information. The at least one processor and the memory are configured to determine that at least one portion of the detailed information is desired by the at least one vehicle, and transmit the at least one portion of the detailed information to the at least one vehicle.

Another aspect of the present disclosure provides an apparatus for vehicle-to-vehicle communication. The apparatus includes means for receiving sensor data from one or more sensors, and means for categorizing the sensor data into common information and detailed information. The apparatus further includes means for broadcasting the common information to at least one other vehicle in a vehicle-to-vehicle (V2V) network. The common information indicates the availability of the detailed information. The apparatus further includes means for determining that at least one portion of the detailed information is desired by the at least one vehicle, and means for transmitting the at least one portion of the detailed information to the at least one vehicle.

Another aspect of the present disclosure provides a computer-readable medium stored with instructions for vehicle-to-vehicle communication. The instructions cause a vehicle to receive sensor data from one or more sensors, and categorize the sensor data into common information and detailed information. The instructions cause the vehicle to broadcast the common information to at least one other vehicle in a vehicle-to-vehicle (V2V) network. The common information indicates the availability of the detailed information. The instructions further cause the vehicle to determine that at least one portion of the detailed information is desired by the at least one vehicle, and transmit the at least one portion of the detailed information to the at least one vehicle.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the present disclosure relate to vehicle-to-vehicle (V2V) communication and data sharing. A vehicle may be equipped with various sensors that can determine the location and movement of the vehicle as well as detecting other objects near the vehicle within a certain detection range, area, and/or space. Sensor data collected by a vehicle's sensors may be categorized into common information and detailed information. The common information is relatively smaller in size than the detailed information and can provide an overview, summary, or simplified version of the detailed information. In addition, the common information can indicate the availability of the detailed information. The common information is broadcasted to nearby vehicles that may be interested in obtaining the detailed information. Based on the received common information, other vehicles may determine the availability and types of detailed information, and request some or all of the detailed information available for sharing. In some examples, a source vehicle may set up unicast and/or multicast sessions to share the detailed information with the interested vehicles.

Figure 1:
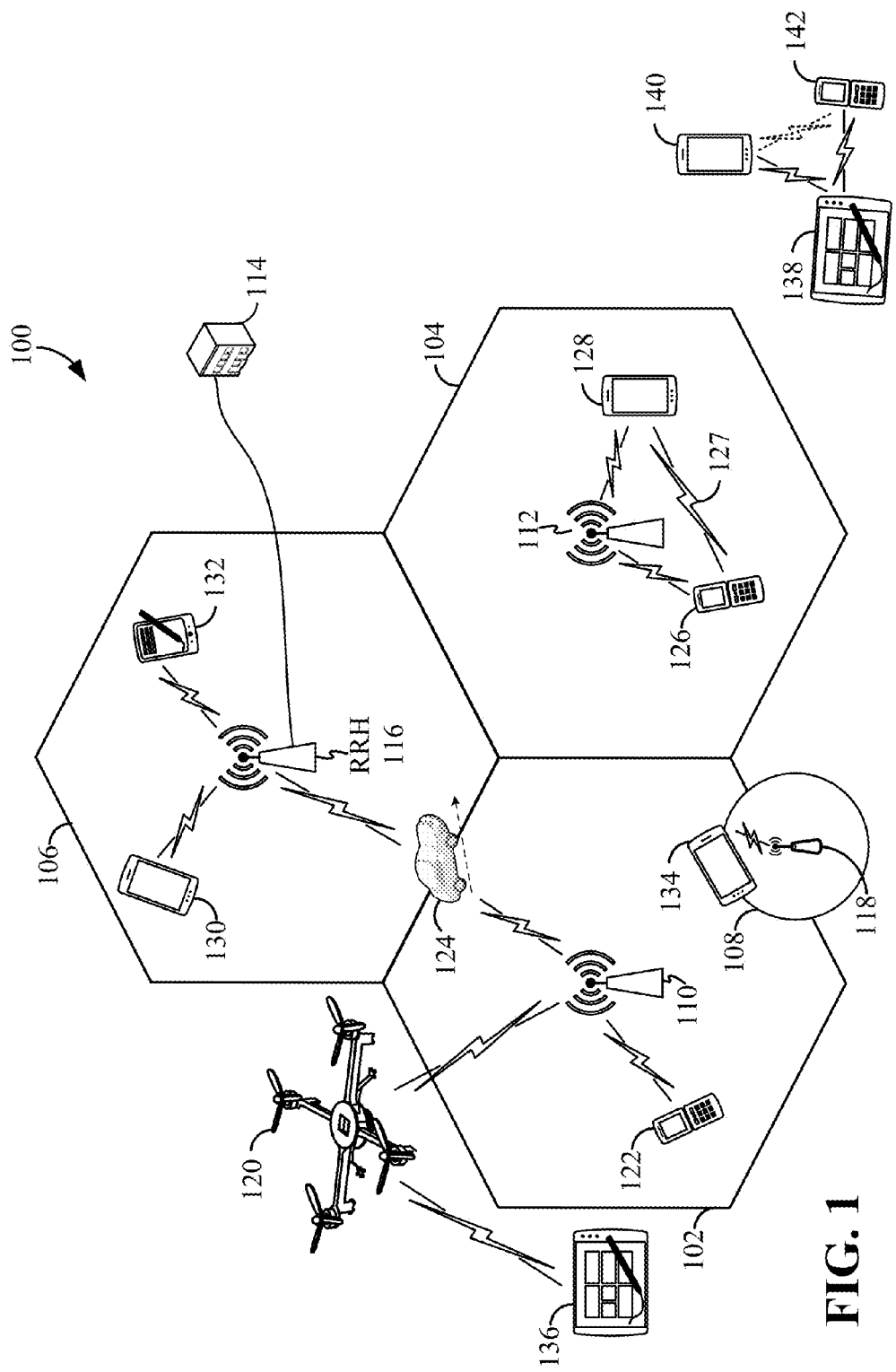
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), gNode B (gNB), or some other suitable terminology. In some examples, a base station may be a road side unit (RSU). That is, an RSU may be a stationary infrastructure entity that combines the functions of an eNB or gNB with the application logic for vehicle communication (e.g., V2V communication).

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

The network of FIG. 1 may also be a multiple-input multiple-output (MIMO) network. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

The network 100 may support single-user MIMO, massive MIMO, and/or multi-user MIMO (MU-MIMO). In single-user MIMO, the transmitter sends one or more streams to the same receiver, taking advantage of capacity gains associated with using multiple Tx, Rx antennas in rich scattering environments where channel variations can be tracked. Massive MIMO is a MIMO system with a very large number of antennas (e.g., greater than an 8×8 array). MU-MIMO is a multi-antenna technology where a base station, in communication with a large number of UEs, can exploit multipath signal propagation to increase overall network capacity by increasing throughput and spectral efficiency, and reducing the required transmission energy. The transmitter may attempt to increase the capacity by transmitting to multiple users using its multiple transmit antennas at the same time, and also using the same allocated time—frequency resources. The receiver may transmit feedback including a quantized version of the channel so that the transmitter can schedule the receivers with good channel separation. The transmitted data is precoded to maximize throughput for users and minimize inter-user interference.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a road side unit (RSU), (i.e., an RSU may be a logical entity that combines the functionality of a UE with the application logic for vehicle communication), a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Communication between two devices may utilize unicast or broadcast transmissions. Transmissions of control information and/or traffic information from a scheduled entity (e.g., base station 110) to one or more scheduled entities (e.g., UEs 122 and 124) may be referred to as downlink (DL) transmission, while transmissions of control information and/or traffic information originating at a scheduled entity (e.g., UE 122) may be referred to as uplink (UL) transmissions. Unicast and broadcast transmissions may also be used between sidelink devices. For example, multiple vehicles 124 may communicate with each other using sidelink communication (e.g., V2V communication).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE (e.g., a vehicle) may function as a scheduling entity, scheduling resources for one or more scheduled entities (e.g., one or more other UEs or vehicles). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138 or a base station.

Figure 2:
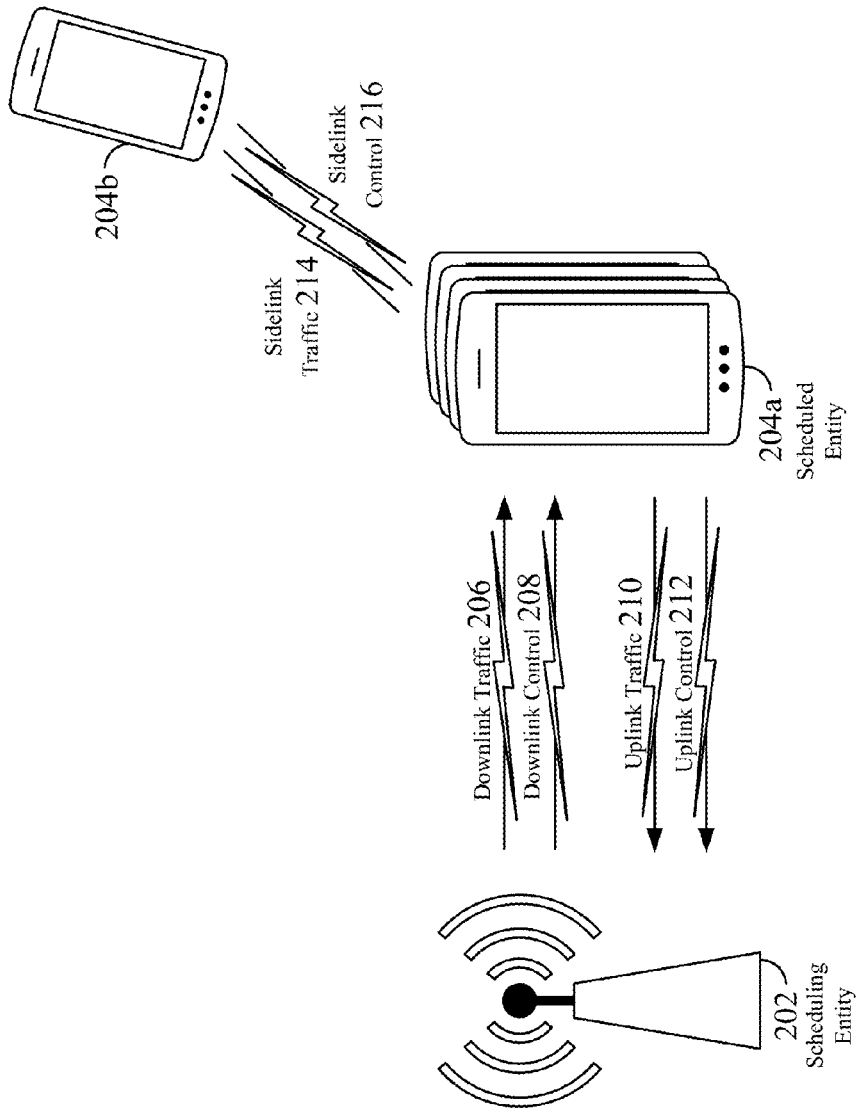
FIG. 2 is a diagram conceptually illustrating an example of a scheduling entity communicating with one or more scheduled entities according to some aspects of the present disclosure.

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204.

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

In some examples, scheduled entities such as a first scheduled entity 204a and a second scheduled entity 204b may utilize sidelink signals for direct D2D communication. In some aspects of the disclosure, the scheduled entities 204a and 204b may be vehicles that utilize sidelink signals for direct V2V communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may in some examples further include a response signal, such as a clear-to-send (CTS) channel and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214. In some examples, the scheduled entities 204 may receive sidelink scheduling or grants from the scheduling entity 202 to facilitate sidelink communication. In some examples, the scheduled entities 204 may engage in sidelink communication without receiving sidelink grants from the scheduling entity 202.

The channels or carriers illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

As described above, a motor vehicle, an automobile, a tractor-trailer, etc. (hereafter generally referred to as "vehicle") may include wireless communication functionality to communicate in a V2V wireless communication network. In some examples, a vehicle may be configured to function as a scheduling entity 202, and/or as a scheduled entity 204, performing conventional cellular communication including uplink and downlink channels. In some examples, the vehicle may be configured to function as a sidelink device, additionally or alternatively communicating over one or more sidelink channels.

In any particular implementation, a vehicle may transmit and receive a variety of different types and amounts of information to/from local or remote sources. As a few nonlimiting examples, a vehicle may transmit and/or receive sensor readings or measurements, location information, navigation information, traffic, warnings or alerts, and/or video streams. To illustrate one example, a data stream including HD video (e.g., 720p or higher resolution) may be transmitted to or receive from a vehicle at a data rate of 2.1 MB per second or higher. At such high data rates, vehicles may need to transmit much more frequently and/or for longer duration; and as a result, the potential for signal interference is increased. Such interference may result in transmission or reception bottlenecks, disruptions, or errors. As vehicles gain more capabilities in data processing and wireless communication technology, the amount of data to be exchanged between vehicles may continue to increase. As one example, more cameras on a vehicle generate additional data with each camera increasing the need for more bandwidth. With more vehicles transmitting more data in a V2V network, more interference may be generated.

While the availability of vehicle sensor and communication data increases, much of the sensor data may be receiver sensitive or selective. It means a vehicle may be interested to receive only some of the data available from other vehicles. For example, much if not most of the data from one vehicle's sensors may only be useful to a handful of nearby vehicles. As one example, the inertial sensor data reading of a vehicle may only be useful for other vehicles immediately nearby. Another example may be that the HD video stream from a vehicle's front camera may only be useful to the vehicle behind it or nearby. Accordingly, various aspects of the present disclosure provide for methods and apparatus for efficiently sharing data between vehicles using, for example, receiver selectivity properties.

Figure 3:
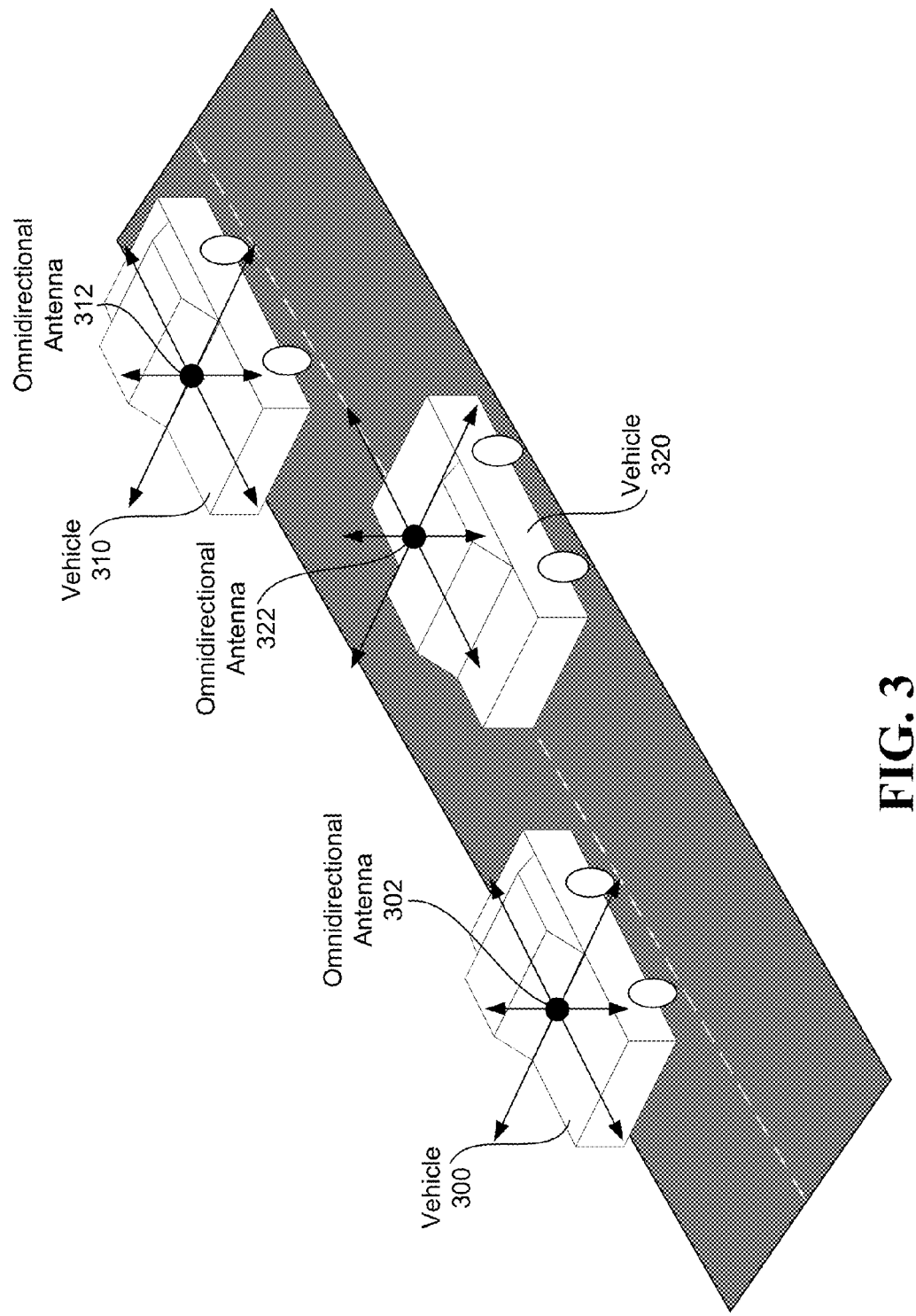
FIG. 3 illustrates various vehicles equipped with vehicle-to-vehicle (V2V) communication enabled devices that utilize omnidirectional antennas according to some aspects of the present disclosure.

FIG. 3 is a diagram illustrating various vehicles equipped with V2V communication enabled devices that utilize an antenna system including one or more antennas in accordance with an aspect of the disclosure. In the illustrated example, vehicle 300, vehicle 310, and vehicle 320 are respectively equipped with omnidirectional antenna 302, omnidirectional antenna 312, and omnidirectional antenna 322. These vehicles may be the UEs illustrated in FIGS. 1 and/or 2. As shown in FIG. 3, omnidirectional antennas may be placed in the interior roof of a vehicle or other positions, such that vehicle data (e.g., sensors data, video) may be transmitted or received by any of the omnidirectional antennas and associated transceivers. In some other examples, directional antennas, smart antennas, or antenna arrays may be used in addition to or in lieu of the omnidirectional antennas. In FIG. 3, the vehicles may communicate with nearby vehicles using sidelink communication or V2V communication.

Figure 4:
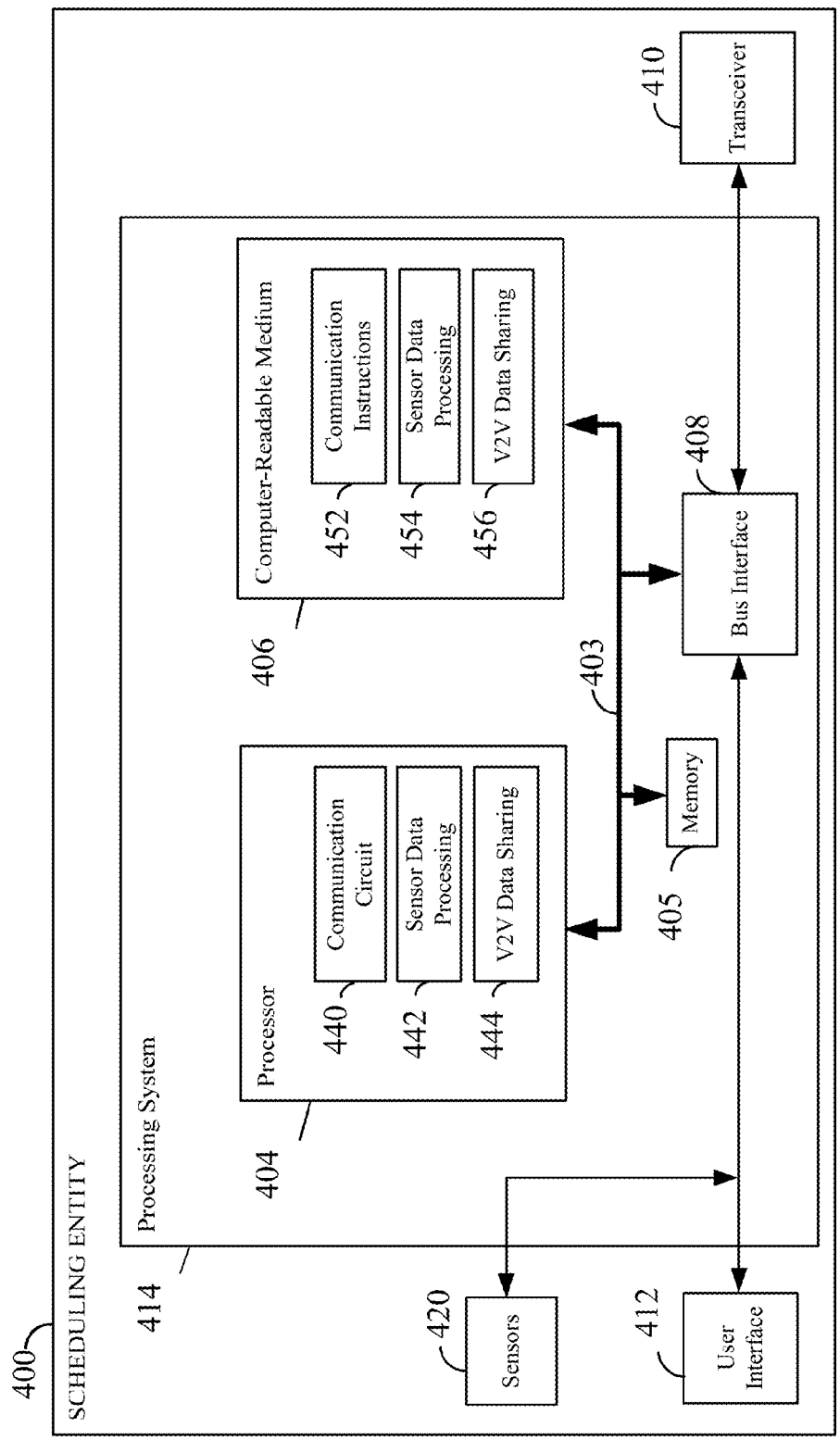
FIG. 4 is a diagram illustrating an example of a hardware implementation for a scheduling entity according to some aspects of the present disclosure.

FIG. 4 is a diagram 400 illustrating an example of a hardware implementation for scheduling entity 202 according to aspects of the present disclosure. As one particular example, a vehicle (e.g., vehicle 300, 310, and/or 320) may include hardware and/or software that enable the vehicle to function as a scheduling entity 202. Scheduling entity 202 may employ a processing system 414. Scheduling entity 202 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 404, as utilized in scheduling entity 202, may be used or configured to implement any one or more of the processes described herein, for example, in relation to FIGS. 6-10.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or a means for communicating with various other apparatuses over a transmission medium. In some examples, the transceiver 410 may include multiple transceivers coupled to multiple antennas to enable unicast and multicast MIMO communication (e.g., V2V communication). Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include sensor data processing instructions 454. The processing instructions 454 may include instructions for performing various operations related to signal processing (e.g., processing a received signal and/or processing a signal for transmission) and sensor data related functions as described herein. In some aspects of the disclosure, the computer-readable medium 406 may include V2V data sharing instructions 456 for performing various V2V data sharing and communication processes and functions as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer.

The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a sensor data processing circuit 442. The sensor data processing circuit 442 may include one or more hardware components that provide the physical structure that performs various processes related to signal processing (e.g., processing a received signal and/or processing a signal for transmission) and sensor data (e.g., vehicle sensor data) related functions as described herein. In some aspects of the disclosure, the processor 404 may also include a V2V data sharing circuit 444. The V2V data sharing circuit 444 may include one or more hardware components that provide the physical structure that performs various V2V data sharing and communication processes and functions as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 5:
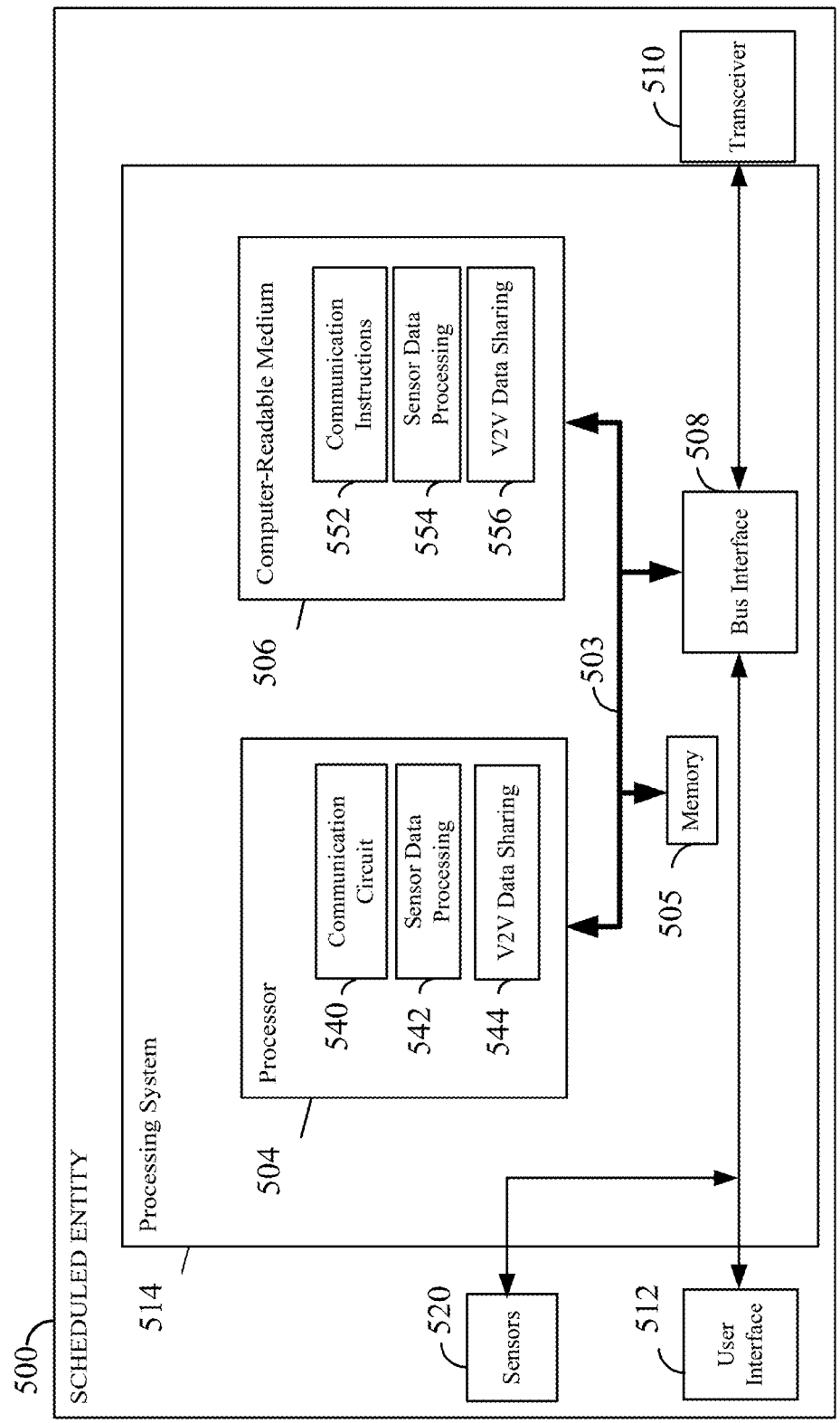
FIG. 5 is a diagram illustrating an example of a hardware implementation for a scheduled entity according to some aspects of the present disclosure.

FIG. 5 is a diagram 500 illustrating an example of a hardware implementation for a scheduled entity 204 according to aspects of the present disclosure. As one particular example, a vehicle (e.g., vehicle 300, 312, and/or 320) may include hardware and/or software enabling the vehicle to function as a scheduled entity 204. Scheduled entity 204 may employ a processing system 514. Scheduled entity 204 may be implemented with a processing system 514 that includes one or more processors 504. Examples of processors 504 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 504, as utilized in scheduled entity 204, may be used or configured to implement any one or more of the processes described herein, for example, in relation to FIGS. 6-10.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits. A bus interface 508 provides an interface between the bus 502 and a transceiver 510. The transceiver 510 provides a communication interface or a means for communicating with various other apparatuses (e.g., vehicles) over a transmission medium. In some examples, the transceiver 510 may include multiple transceivers coupled to multiple antennas to enable unicast and multicast MIMO communication. Depending upon the nature of the apparatus, a user interface 512 (e.g., keypad, display, speaker, microphone, joystick) may also be provided.

At least one processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software. In some aspects of the disclosure, the computer-readable medium 506 may include communication instructions 552. The communication instructions 552 may include instructions for performing various operations related to wireless communication (e.g., signal reception and/or signal transmission) and V2V communication as described herein. In some aspects of the disclosure, the computer-readable medium 506 may include sensor data processing instructions 554. The sensor data processing instructions 554 may include instructions for performing various operations related to signal processing (e.g., processing a received signal and/or processing a signal for transmission) and sensor data processing as described herein.

At least one processor 504 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 504 may include a communication circuit 540. The communication circuit 540 may include one or more hardware components that provide the physical structure that performs various processes related to wireless communication (e.g., signal reception and/or signal transmission) and V2V communication as described herein. In some aspects of the disclosure, the processor 504 may also include a sensor data processing circuit 542. The sensor data processing circuit 542 may include one or more hardware components that provide the physical structure that performs various processes related to signal processing (e.g., processing a received signal and/or processing a signal for transmission) and sensor data processing as described herein. In some aspects of the disclosure, the processor 504 may also include a V2V data sharing circuit 544. The V2V data sharing circuit 544 may include one or more hardware components that provide the physical structure that performs various V2V data sharing processes and functions as described herein. The circuitry included in the processor 504 is provided as non-limiting examples. Other means for carrying out the described functions exists and is included within various aspects of the present disclosure. In some aspects of the disclosure, the computer-readable medium 506 may store computer-executable code comprising instructions configured to perform various processes described herein. The instructions included in the computer-readable medium 506 are provided as non-limiting examples. Other instructions configured to carry out the described functions exist and are included within various aspects of the present disclosure.

Embodiments described herein provide methods and apparatus for improving the efficiency of information (e.g., sensor data, video stream) sharing between vehicles using receiver selectivity properties. The sensor data may be receiver selective because most of the data from one vehicle may be useful to a small number of nearby vehicles. For example, the inertial sensor reading of a vehicle may only be useful for the cars immediately around it; similarly, the HD video stream from a front mounted camera may be useful only for the vehicles behind it. Therefore, it will be inefficiency to share all available sensor or vehicle information between vehicles.

Figure 6:
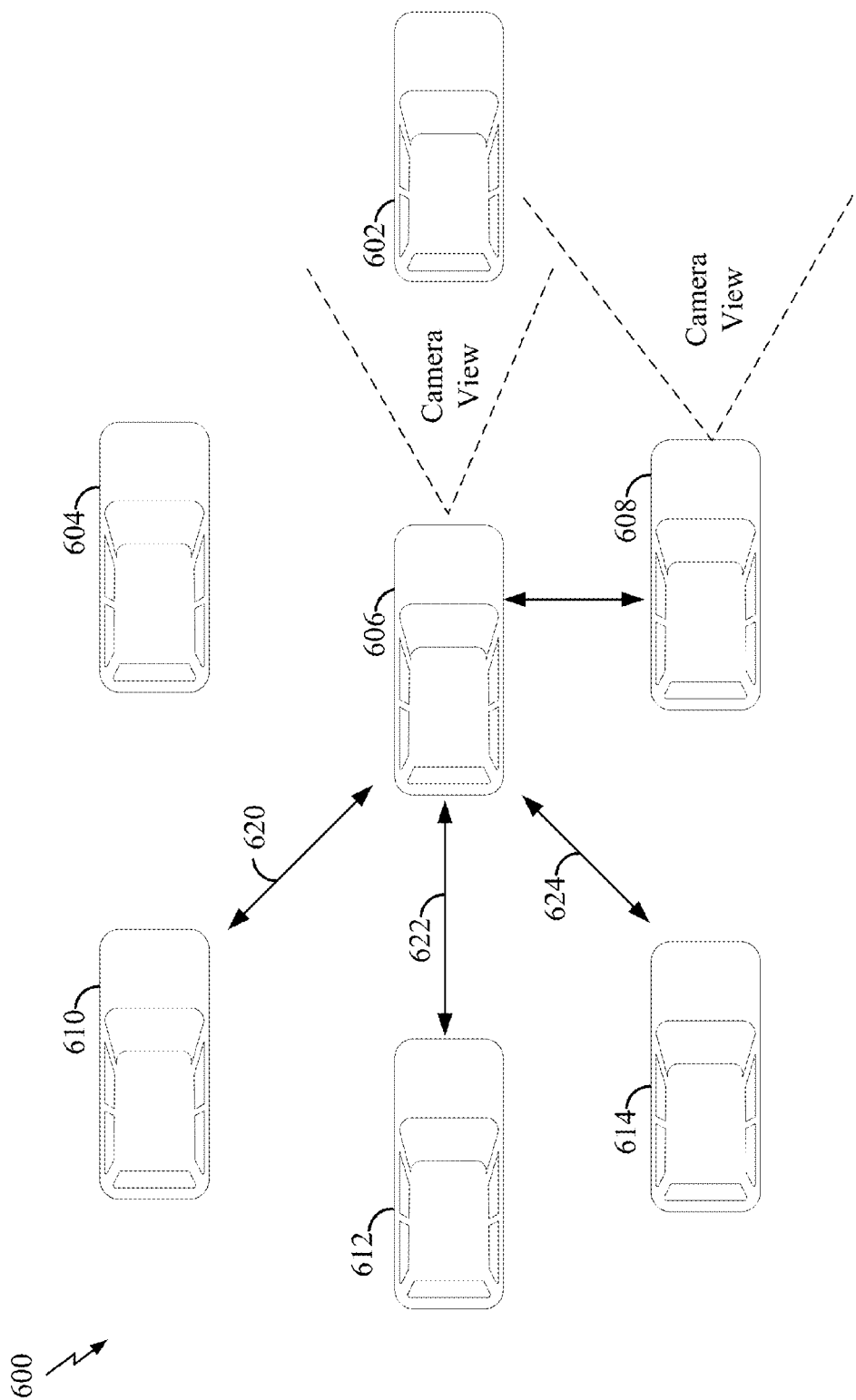
FIG. 6 is a diagram conceptually illustrating an example of a V2V network according to some aspects of the present disclosure.

FIG. 6 illustrates a few exemplary vehicles in relative proximity to one another. In accordance with an aspect of the present disclosure, these vehicles may communicate with one another in a vehicle-to-vehicle (V2V) network 600, which may be configured as any suitable network that enables at least direct communication from one vehicle to another. For example, the V2V network may be configured as a D2D network and/or a network utilizing sidelink signals.

In some examples, a sidelink signal may refer to a signal communicated from one scheduled entity 204 (e.g., vehicle 606) to another scheduled entity 204 (e.g., vehicle 610) without relaying that communication through a scheduling entity 202 (e.g., a base station or RSU), even though the base station may be utilized for scheduling and/or control purposes. In these examples, the sidelink signals may generally be communicated using licensed spectrum (unlike wireless local area networks, which typically use an unlicensed spectrum).

In another example, sidelink signals may be transmitted over unlicensed spectrum. Here, access to unlicensed spectrum may require sharing the unlicensed spectrum with other types of unlicensed wireless communication, such as Wi-Fi, Bluetooth, LTE-U (Long Term Evolution (LTE) in unlicensed spectrum), LAA (Licensed-Assisted Access), or MuLTEfire (a form of LTE deployment in unlicensed frequency bands). Therefore, to provide fair sharing of the unlicensed spectrum between unlicensed devices (e.g., both sidelink devices and other types of devices utilizing the unlicensed spectrum), sidelink wireless communication over unlicensed spectrum may utilize "Listen Before Talk" (LBT) techniques or the like. LBT is a contention-based protocol used in wireless communication that allows several wireless devices to utilize or share the same spectrum or channel.

Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications.

Referring once again to FIG. 6, a vehicle 606 has a front mount camera or sensor that can detect another vehicle (e.g., vehicle 602) in front of it. For example, vehicles 610, 612, and 614 cannot see or detect vehicle 602 by their frontal cameras or sensors because they may be blocked by vehicle 604, vehicle 606, and/or vehicle 608. In one example, vehicle 606 may share its frontal camera stream data with vehicle 610, vehicle 612, and vehicle 614 so that they can "see" or detect vehicle 602 via the video stream. In some examples, the vehicles may have more than one camera (e.g., front, back, and/or side cameras). However, if a vehicle (e.g., vehicle 606) shares its camera stream and/or other sensor data with all other vehicles in proximity, it may unnecessarily waste communication bandwidth because some sensor data and/or video stream data may not be useful to or needed by some vehicles. The data (e.g., sensor data, video stream data, etc.) available for sharing between vehicles may be referred to as "vehicle data" in this disclosure. A vehicle providing vehicle data to other vehicle(s) may be referred to as a source vehicle, vehicle data source, or source in this disclosure.

Aspects of the present disclosure provide methods to improve the efficiency of sharing vehicle data by differentiating and/or categorizing the vehicle data. To this end, vehicle data of a vehicle (e.g., vehicle 606) first undergoes data differentiation. In data differentiation, the vehicle data (e.g., sensor data) may be divided or categorized into two or more parts, including but not limited to common information, and detailed information. The first part, e.g., the common information, may be smaller in size relative to the detailed information but is generally useful to other nearby vehicles. In some examples, the common information size may be about a few hundred bytes in a transmission. Keeping this common information small in size helps to reduce transmission congestion and interference because the transmission of the common information will consume less bandwidth and/or time. In some examples, the common information may include sensor data detected or measured by the vehicle, including but not limited to satellite-based (e.g., GPS) data such as a location, heading, and/or speed; and may also contain information about objects detected by the vehicle. For the scenario in FIG. 6, vehicle 606 may provide common information that contains information about vehicle 602, which is detected by vehicle 606. The common information may additionally or alternatively contain the advertisement about the type, kind, or category of sensor data or detailed information that a vehicle has for sharing and the coverage space of those kinds of sensors. The type, kind, or category of sensor data or detailed information may include, but is not limited to, accelerometer data, gyroscope data, HD video streams from front cameras, rear cameras, and left and right side cameras, lidar response streams, radar response streams, proximity data of obstacles, heading data, speed data, and geolocation data.

Figure 7:
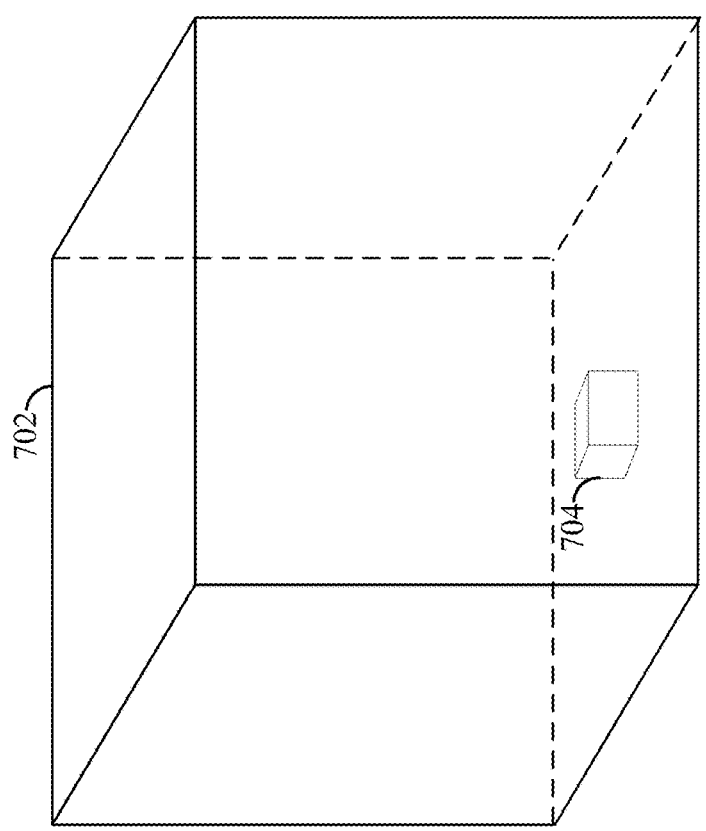
FIG. 7 is a diagram illustrating a union of unit 3D cubes representing the covering space of a sensor according to some aspects of the present disclosure.

FIG. 7 is a diagram illustrating a union of unit 3D cubes of a pre-determined 3D grid that may represent the coverage space or range of a given sensor type. In FIG. 7, the cube 702 represents the union of a predetermined number of 3D cubes, which are not shown individually in the figure. This 3D cube 702 may correspond to the coverage space or range of an exemplary sensor 704 or vehicle. The sensor 704 may be located anywhere within the cube 702, and is not limited to the exemplary location within the cube 702 illustrated in FIG. 7. Such 3D grid may be common to all vehicles, and may be constructed using global navigation satellite system (GNSS) coordination or any other positioning system. The width, length, and height of the 3D cube 702 may be the same or different. In some examples, the 3D cube 702 may have other shapes instead of rectangular. That is, within the present disclosure, the exemplary cube is merely for illustration, and reference to a 3D "cube" does not refer exclusively to a proper geometric cube. In general, a 3D cube within the present disclosure may be any suitable three-dimensional volume. The 3D cube may have different shapes and/or sizes for different sensors. In some examples, the 3D cube may be replaced by a two-dimensional space or area. For example, the coverage space for accelerometer and gyroscope data can be the vehicle itself. The coverage space for HD video streams can be the visual field of the corresponding camera. The coverage space of lidar and/or radar response streams may be a complete or partial circle or sphere of radius d surrounding the vehicle where d is the detecting range of the lidar or radar system in use. Based on the advertisement information, vehicles may determine to request detailed information or not, and which kind of the detail information covering which 3D cube it would like to request.

Figure 8:
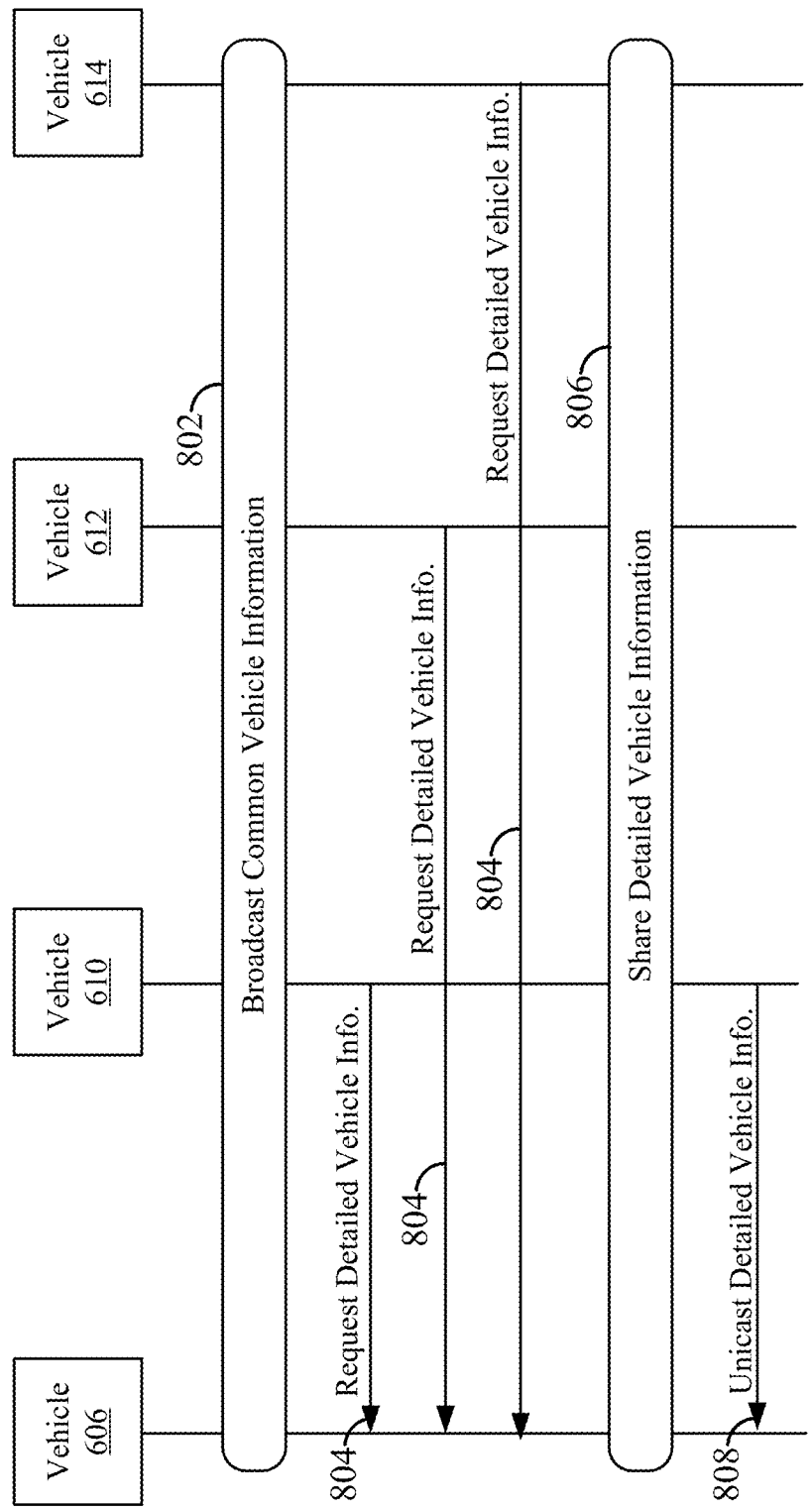
FIG. 8 is a diagram illustrating V2V communication using common information and detailed information according to some aspects of the disclosure.

FIG. 8 is a diagram illustrating vehicle-to-vehicle communication using common information and detailed information according to some aspects of the disclosure. For example, vehicle 606 may periodically broadcast common information 802 using a small portion of available bandwidth. For example, the common information may be broadcasted using a bandwidth of about 5 MHz to about 10 MHz. This common information broadcast may include the common information described above, and/or information about the type, kind, and/or category of detailed information that the vehicle 606 may have available. Similarly, other vehicles (e.g., vehicle 610, vehicle 612, and/or vehicle 614) may broadcast their common information. For example, the common information may be a message that includes multiple data fields each corresponding to a predetermined type, kind, or category of detailed information. The field may be set to a certain value (e.g., a value of 1) to indicate the available of the specific type, kind, or category of detailed information. In other examples, the common information may include a message that is encoded to indicate the availability of one or more types, kinds, and categories of the detailed information.

In some examples, the common information broadcast 802 may further include one or more reference signals. This reference signal enables a receiver to measure the channel or determine channel quality between the receiver and the transmitting vehicle. Such measurement can be used, for example, to configure MIMO transmission among the interested vehicles that may receive or request the detailed information using MIMO. In this example, vehicles 610, 612, and 614 can use the reference signal to measure the channels (e.g., channel 620, channel 622, and channel 624 in FIG. 6) between vehicle 606 and themselves. MIMO networks enable a transmitter to transmit multiple data streams concurrently to either one client (e.g., single-user MIMO) or multiple clients (e.g., MU-MIMO). For example, vehicle 606 can transmit one or more MIMO streams to each of vehicles 610, 612, and/or 614.

In response to the common information or advertisement of the available data (e.g., detailed information), one or more vehicles interested in the detailed information (e.g., more detailed sensor information, video stream data, proximity data of obstacles) may signal their interest to the transmitting vehicle or source, using a lightweight feedback channel. This feedback channel message may be small, to avoid or reduce interference and bandwidth issues. For example, the feedback channel may utilize relatively little bandwidth. In another example, the feedback channel may utilize relatively short or brief-duration transmissions, e.g., limited to one, or only a few, symbols. In still another example, the feedback channel may utilize one or more short-symbol durations, i.e., utilizing shorter symbols than one or more other channels transmitted between the vehicles. By its use of the feedback channel, a vehicle may signal its interest in the entire detailed information, or a specific portion of the detailed information that is available. For example, a vehicle may signal its interest to receive certain sensor data and/or video streams, which are only some of the available data. The feedback from the interested vehicle may also include channel state feedback such as the channel measurement using the reference signals contained in the common information broadcast 802, e.g., to facilitate MIMO configuration.

In one example, vehicles 610, 612, and 614 may each determine to request detailed information from source vehicle 606. To that end, each interested vehicle may transmit a feedback message 804 to request the detailed information. In one example, the feedback message 804 may include a plurality of data fields each corresponding to a type, kind, or category of detailed information or sensor data. Each of these data fields can be set to a predetermined value to indicate that the vehicle is interested to receive the specific detailed information. In other examples, the feedback message 804 may be encoded to indicate the interested detailed information. For example, the requested detailed information may include the HD video stream from vehicle 606 covering 3D unit cubes or a camera view corresponding to vehicle 602. Each vehicle 610, 612, and/or 614 may signal its particular interest, together with their channel measurement result using the lightweight feedback channel 804.

Once the vehicles have expressed their interests in particular detailed information (e.g., sensor data or video stream), the source vehicle may transmit the detailed information 806 to be shared with the interested vehicles, using either a unicast or multicast session, based on the number of vehicles that expressed interest. In some examples, different data streams containing various sensor data going to one receiving vehicle may be bundled into one package to be delivered by a unicast link. In one example, the lidar stream, radar reading stream, and video streams from multiple cameras can be bundled in a package of a suitable data format to be delivered by the unicast link. In some examples, the source vehicle may use a multicast link to deliver the same data stream or package containing detailed information to multiple receiving vehicles. This method provides for an efficient and flexible unicast/multicast transmission model by amortizing the control overhead over multiple data streams.

In FIGS. 6 and 8, for example, after vehicle 610, vehicle 612, and/or vehicle 614 express their interests to vehicle 606 in the portion of frontal HD camera stream covering vehicle 602, vehicle 606 may deliver that data to vehicles 610, 612, and/or 614 by multicast. In another example, vehicle 612 may also request from vehicle 606 its left side HD camera stream covering vehicle 604 and right side HD camera stream covering vehicle 608. Those data streams may be delivered to vehicle 612 by unicast as one bundled package.

In a further aspect of the disclosure, a source vehicle may also indicate its interest in particular type(s) of detailed data, e.g., in its common information broadcast 802. For example, vehicle 606 may indicate the interested type(s) in its common information broadcast 802. Other vehicles (e.g., vehicles 610, 612, 614) who received the common information broadcast may then determine if they have the requested type of detailed information. These vehicles may then establish a unicast link 808 to share the data of interest with the requesting vehicle.

In one example, a vehicle with advanced computer vision processing may detect that there is an obstacle at one or several 3D unit cubes, or detection zones or areas. In order to detect or determine the position of the obstacle more accurately, it may request that other vehicles share their sensor data that can provide more information on the obstacle at the desired 3D unit cubes. This data may be a video stream, radar data, lidar data, or other similar data. Using FIG. 6 as an example, vehicle 606 may detect vehicle 602 as the obstacle. Then vehicle 606 may send a request to other vehicle(s) nearby for additional data covering vehicle 602, for example, to detect the relative position and speed between it and vehicle 602. In this case, vehicle 604 may have those data, and may respond with a positive indication. Then those data may be shared between vehicles 604 and 606 using either unicast or multicast.

Figure 9:
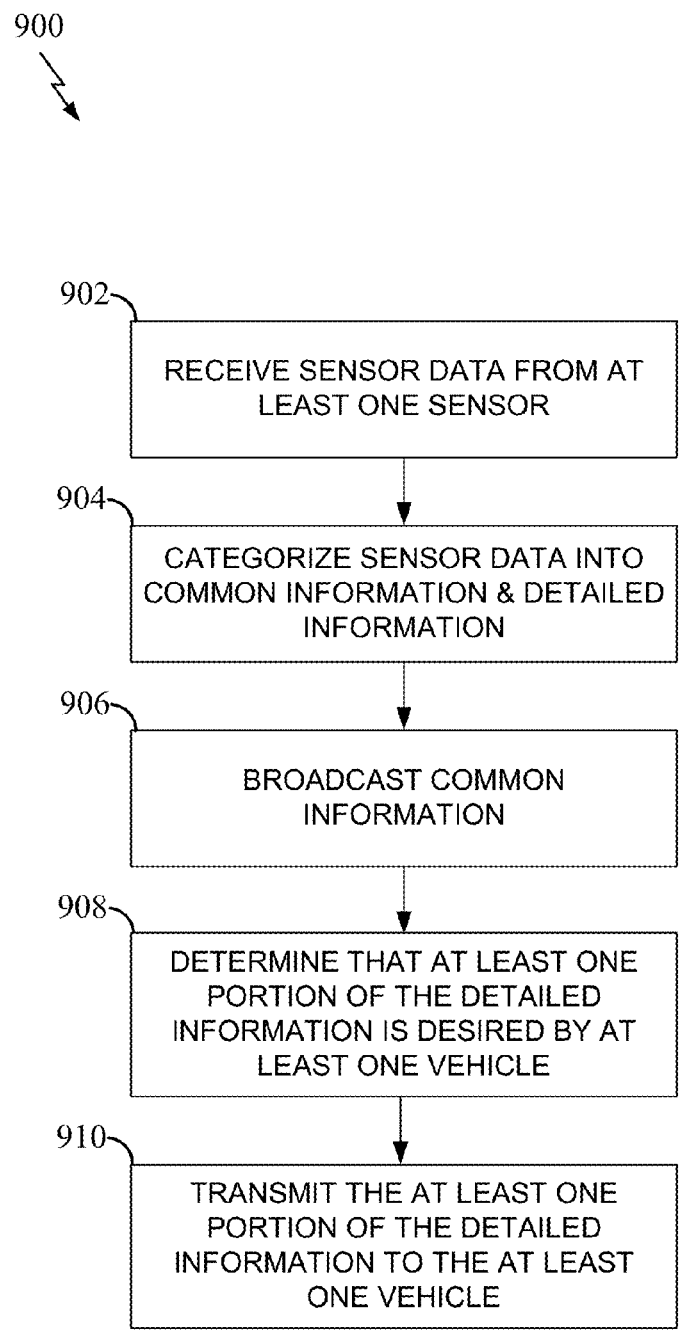
FIG. 9 is a flowchart of a method of transmitting common information and detailed information according to some aspects of the present disclosure.

FIG. 9 is a flowchart of a method 900 of transmitting common information and detailed information in a V2V network according to some aspects of the disclosure. The method 900 may be performed at a source vehicle, for example, vehicle 606 (see FIG. 6) or any vehicle illustrated in FIG. 6. At block 902, the source vehicle may receive sensor data from one or more sensors and/or cameras. For example, vehicle 606 may utilize a sensor data processing circuit 442 or 542 to receive sensor data from its sensors 420 or 520 (see FIGS. 4 and 5). This sensor data may include video streams (e.g., HD video stream) from one or more cameras, geolocation data (e.g., satellite-based location data, cellular based location data), accelerometer data, gyroscope information, proximity data of obstacles, and/or other sensor data.

At block 904, vehicle 606 may utilize the sensor data processing circuit 442 or 542 to categorize this sensor data into common information and detailed information. For example, the common information may include some basic information about the vehicle and the types, kinds, and categories of detailed information available for sharing. Some of the detailed information may provide the location and/or movement of the vehicle, and other detailed information may provide information on a predetermined area or space surrounding the vehicle. The detailed information enables the vehicle to identify, process, and/or comprehend events or objects in the predetermined area or space surrounding the vehicle.

At block 906, vehicle 606 may broadcast this common information to at least one vehicle in a V2V network. For example, vehicle 606 may utilize a communication circuit 440 or 540 and a transceiver 410 or 510 to broadcast the common information periodically to other vehicles (e.g., vehicles 610, 612, and 614 of FIG. 6) nearby in the V2V network. The common information may indicate the types, kinds, and categories of sensor data available for sharing in the detailed information. In response to the broadcasted common information, a client vehicle may indicate interest in the detailed information by sending a feedback or request message (e.g., message 804 of FIG. 8).

At block 908, based on the received feedback or request, the vehicle 606 may determine that at least one portion of the detailed information is desired by the at least one vehicle (e.g., vehicle 610, 612, or 614). For example, vehicle 606 may utilize the V2V data sharing circuit 444 or 544 to determine that a client vehicle desires to receive some or all of the detailed information. The feedback message or request may be received via a sidelink channel or D2D channel.

At block 910, vehicle 606 may transmit the desired detailed information to the at least one vehicle. For example, vehicle 606 may utilize the V2V data sharing circuit 444 or 544 and communication circuit 440 or 540 to transmit the desired detailed information to one or more vehicles (e.g., vehicle 610, 612 and/or 614). The desired or requested detailed information may include various sensor data available at source vehicle 606, and some or all of the detailed information may be transmitted to other vehicles via V2V communication. For example, the detailed information may include one or more of heading data, speed data, geolocation data, gyroscopic data, proximity data of obstacles, etc.

In various embodiments, source vehicle 606 may transmit the requested detailed information using unicast or multicast link. In one example, a unicast link may be set up if a vehicle expresses interest in or requests at least a portion of the detailed information. In one example, this unicast link may be a MIMO link or channel. In MIMO communication, vehicle 606 may utilize transmitters with multiple antennas to transmit multiple data streams concurrently to one or several receivers. For example, referring to FIG. 6, vehicle 606 may simultaneously transmit detailed information to client vehicles 610, 612, and 614, which may be scheduled entities. In MIMO communication, the receiver(s) may need to estimate the channel state information (CSI) and report it to the transmitter, in this case vehicle 606. CSI may be used to determine or predict how a signal may propagate from the transmitter to the receiver, and the signal may be subject to the effects of scattering, fading, and power decay with distance, etc. The transmitter may use the CSI to adapt its transmission so as to reduce or eliminate interference between different transmitters in the network. The CSI estimation may be done using reference signals embedded in the broadcasted common information from vehicle 606. The client vehicles may report the CSI in the feedback channels, for example, from vehicles 610, 612, and 614 to vehicle 606.

The CSI is a key component in MIMO technologies. Due to the multipaths a wireless signal may take, the received signal may be a combination of different delayed and attenuated copies of each sent signal, with the CSI regarded as the coefficient of this combination. This information may be used by a MIMO transmitter to precode signals to boost received signal strength or remove interference between concurrent data streams. Massive MIMO, which requires massive antenna array (usually larger than 8-antenna element) and massive or substantial signal processing at the transmitter, may be used in 5G networks to increase data rate and/or to increase range. Massive MIMO allows greater power control and beamforming, which may provide more targeted transmit signals that generate less interference. When massive MIMO is also available at the receiver side, the number of concurrent data streams may be increased significantly which may provide greater data rate.

By exploiting spatial diversity, a transmitter with multiple antennas may either use its antennas to transmit the same stream to achieve a power gain for the enhancement of the receiver's signal-to-noise ratio (SNR) or enable concurrent transmission of multiple different streams in order to achieve multiplexing gain. For V2V communication, as there is little constraint in form factor, energy consumption and equipment complexity, massive antenna array and massive MIMO processing may be deployed at both transmitters and receivers.

Based on the feedback received, the transmitting vehicle (e.g., source vehicle) may set up a unicast or a multicast link to share the requested detailed information. In general, if the transmission distance is greater than a predetermined distance, a transmitter may use MIMO to beamform the signal. On the other hand, if the transmission distance is smaller than a predetermined distance, the transmitter may use MIMO to increase the number of data streams. In FIG. 6, for example, vehicle 608 may receive a request from vehicle 606 for the camera covering vehicle 602. In this case, a unicast link may be set up, and may use massive MIMO for higher bandwidth. If the transmission link will be long, as would be the case, when vehicle 606 is relatively far from vehicle 608, MIMO may be used for beamforming to extend signal range. If the transmission distance is relatively short, MIMO may be used to increase the number of data streams in a unicast link. For example, multiple unicast links may be set up if there are a small number of vehicles, e.g. up to 3-4 vehicles, that express interest in a detailed data portion. In this case, for each unicast link, massive MIMO may be employed as described above.

In some examples, a multicast session may be set up if there are a large number of, e.g. more than 4 vehicles (anyway this number can be configured depend on system design to get the best trade off in terms of spectrum efficiency), vehicles that express interest in the same detailed data portion. For this multicast transmission, blind MIMO, that is MIMO without CSI feedback, may be employed to improve the spectral efficiency. This increase in efficiency comes at the cost of increased complexity on the receiver side. In addition, to reduce the amount of acknowledgement/non-acknowledgement (ACK/NACK) feedback overhead used in signaling, a variety of methods may be used to reduce overhead. For example, rateless coding may be used at the transmitter, which allows for only one ACK instant per receiver at the end of the session.

In some examples, all ACK/NACK messages may be transmitted in a "Single Frequency Network" (SFN) manner so that only one ACK/NACK is needed for all receivers at each feedback instant. In SFN transmission, all the messages from multiple vehicles may contain the same information, including coding, reference signal, CRC generation, scrambling, etc. and they have to be transmitted in a synchronized manner. This way, the receiving vehicle can see this as only one identical message transmitted from a big antenna array making up from antenna arrays of all transmitting vehicles.

Depending on the overall traffic loading, the multiplexing of common information and detailed information transmissions may be orthogonal, and may use TDM, FDM or similar methodologies. Such methodologies may afford better range, but may create additional traffic loading. The multiplexing of common information and detailed information transmissions may also be non-orthogonal, and may use CDM. In these cases, the range may be less than orthogonal multiplexing described above, but may also reduce the traffic load.

Figure 10:
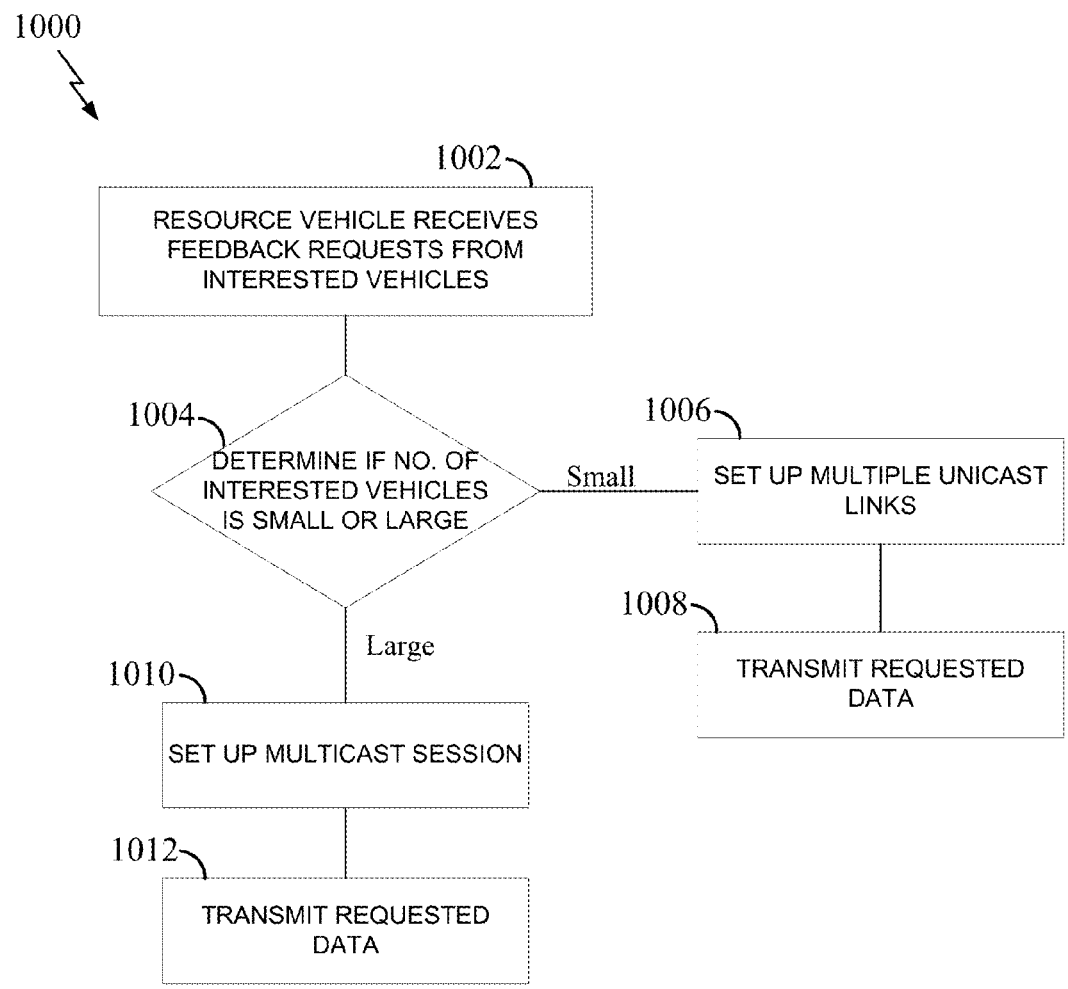
FIG. 10 is a flowchart of a method of determining if a unicast or multicast link is established in V2V communication, according to some aspects of the present disclosure.

FIG. 10 depicts a flowchart of a method of setting up a unicast or multicast link to share the requested detailed information according to some aspects of the disclosure. This method may be used by the vehicles illustrated in FIG. 6 during V2V communication or any other apparatus to request detailed information as described above. At block 1002, source vehicle 606 in FIG. 6 may utilize its communication circuit and transceiver to receive feedbacks or requests for detailed information from interested client vehicles. One or more interested vehicles (vehicles 610, 612, and 614) may send a feedback message to the source vehicle and indicate the type, kind, and/or category of detailed information they are interested in. For example, the request may be similar to the feedback messages 804 described above in relation to FIG. 8. At decision block 1004, after vehicle 606 received the request or feedback, vehicle 606 may determine whether the number of interested vehicles requesting for detailed information is small or large. Vehicle 606 may use one or more predetermined numbers or thresholds to make the determination. For example, if the number of interested vehicles is greater than a predetermined number, vehicle 606 may determine that the number of interested vehicles is large. On the contrary, if the number of interested vehicles is smaller than a predetermined number, vehicle 606 may determine that the number of interested vehicles is small. This determination may be made for each transmission of detailed information.

At block 1006, if the number of interested vehicles is small, vehicle 606 may set up multiple unicast links. Then at block 1008, vehicle 606 transmits the requested data (detailed information) to the interested vehicle(s) using multiple unicast links. For example, vehicle 606 may use a different unicast link to transmit the requested detailed information to each interested vehicle. At block 1010, if the number of interested vehicles is large, vehicle 606 may set up a multicast session. Then at block 1012, vehicle 606 may transmit the requested data or detailed information to the interested vehicle(s) using a multicast link.

It is noted here that the presently disclosed methodology described in FIGS. 1-10 may be employed in the communication between the scheduling entity 202 shown in FIGS. 2 and 4 and the scheduled entity (or entities) 204 shown in FIGS. 2 and 5. The present methods and apparatus are contemplated as being applicable to licensed spectrum systems for wireless communication as well. In some examples, access to unlicensed spectrum with a 5G New Radio (NR) system, for example, may require sharing the unlicensed spectrum with traditional types of unlicensed wireless communication, such as Wi-Fi, Bluetooth, LTE-U (Long Term Evolution (LTE) in unlicensed spectrum), LAA (Licensed-Assisted Access), or MuLTEfire.

Several aspects of a wireless communication network have been presented with reference to exemplary implementations. As those skilled in the art will readily appreciate, various aspects described throughout this disclosure may be extended to other telecommunication systems, network architectures and communication standards. By way of example, various aspects may be implemented within systems defined by 3GPP, such as Long-Term Evolution (LTE), the Evolved Packet System (EPS), the Universal Mobile Telecommunication System (UMTS), the Global System for Mobile (GSM), and/or New Radio (NR). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for vehicle-to-vehicle communication, comprising:
   receiving sensor data from one or more sensors;
   categorizing the sensor data into common information and detailed information;
   broadcasting the common information to at least one vehicle in a vehicle-to-vehicle (V2V) network, the common information indicating the availability of the detailed information;
   determining that at least one portion of the detailed information is desired by the at least one vehicle; and
   transmitting the at least one portion of the detailed information to the at least one vehicle.

2. The method of claim 1, wherein the detailed information comprises at least one of heading data, speed data, geolocation data, gyroscopic data, accelerometer data, proximity data of obstacles, image data, or video data.

3. The method of claim 1, wherein the broadcasting comprises:
   indicating desired detailed information generated by one or more sensors of the at least one vehicle in the V2V network.

4. The method of claim 1, further comprising:
   receiving, from the at least one vehicle in the V2V network desiring the detailed information, a message indicating which portions of the detailed information are desired.

5. The method of claim 4, further comprising:
   determining a number of vehicles requesting detailed data;
   determining if a unicast or multicast message is sent, based on the number of vehicles requesting the detailed data;
   sending a unicast message if the number of vehicles requesting the detailed data is smaller than a predetermined number; and
   sending a multicast message if the number of vehicles requesting the detailed data is larger than a predetermined number.

6. The method of claim 5, further comprising:
   determining a transmission distance for the detailed information;
   if the transmission distance for the detailed information is longer than a predetermined distance, transmitting the detailed information using multiple-input multiple-output (MIMO) beamforming; and if the transmission distance for the detailed data is shorter than a predetermined distance, transmitting the detailed information using MIMO to increase a number of data streams in a unicast link.

7. The method of claim 1, wherein the common information is smaller in size than the detailed information.

8. An apparatus for vehicle-to-vehicle communication, comprising:
at least one processor;
at least one transceiver communicatively coupled to the at least one processor; and
a memory communicatively coupled to the at least one processor, wherein the at least one processor and the memory are configured to:
receive sensor data from one or more sensors;
categorize the sensor data into common information and detailed information;
broadcast the common information to at least one vehicle in a vehicle-to-vehicle (V2V) network, the common information indicating the availability of the detailed information;
determine that at least one portion of the detailed information is desired by the at least one vehicle; and
transmit the at least one portion of the detailed information to the at least one vehicle.

9. The apparatus of claim 8, wherein the detailed information comprises at least one of heading data, speed data, geolocation data, gyroscopic data, accelerometer data, proximity data of obstacles, image data, or video data.

10. The apparatus of claim 8, wherein, to broadcast the common information, the at least one processor and the memory are further configured to:
indicate desired detailed information generated by one or more sensors of the at least one vehicle in the V2V network.

11. The apparatus of claim 8, wherein the at least one processor and the memory are further configured to:
receive, from the at least one vehicle in the V2V network desiring the detailed information, a message indicating which portions of the detailed information are desired.

12. The apparatus of claim 11, wherein the at least one processor and the memory are further configured to:
determine a number of vehicles requesting detailed data;
determine if a unicast or multicast message is sent, based on the number of vehicles requesting the detailed data;
send a unicast message if the number of vehicles requesting the detailed data is smaller than a predetermined number; and
send a multicast message if the number of vehicles requesting the detailed data is larger than a predetermined number.

13. The apparatus of claim 12, wherein the at least one processor and the memory are further configured to:
determine a transmission distance for the detailed information;
if the transmission distance for the detailed information is longer than a predetermined distance, transmit the detailed information using multiple-input multiple-output (MIMO) beamforming; and
if the transmission distance for the detailed data is shorter than a predetermined distance, transmit the detailed information using MIMO to increase a number of data streams in a unicast link.

14. The apparatus of claim 8, wherein the common information is smaller in size than the detailed information.

15. An apparatus for vehicle-to-vehicle communication, comprising:
means for receiving sensor data from one or more sensors;
means for categorizing the sensor data into common information and detailed information;
means for broadcasting the common information to at least one vehicle in a vehicle-to-vehicle (V2V) network, the common information indicating the availability of the detailed information;
means for determining that at least one portion of the detailed information is desired by the at least one vehicle; and
means for transmitting the at least one portion of the detailed information to the at least one vehicle.

16. The apparatus of claim 15, wherein the detailed information comprises at least one of heading data, speed data, geolocation data, gyroscopic data, accelerometer data, proximity data of obstacles, image data, or video data.

17. The apparatus of claim 15, wherein the means for broadcasting is configured to:
indicate desired detailed information generated by one or more sensors of the at least one vehicle in the V2V network.

18. The apparatus of claim 15, further comprising:
means for receiving, from the at least one vehicle in the V2V network desiring the detailed information, a message indicating which portions of the detailed information are desired.

19. The apparatus of claim 18, further comprising:
means for determining a number of vehicles requesting detailed data;
means for determining if a unicast or multicast message is sent, based on the number of vehicles requesting the detailed data;
means for sending a unicast message if the number of vehicles requesting the detailed data is smaller than a predetermined number; and
means for sending a multicast message if the number of vehicles requesting the detailed data is larger than a predetermined number.

20. The apparatus of claim 19, further comprising:
means for determining a transmission distance for the detailed information;
means for if the transmission distance for the detailed information is longer than a predetermined distance, transmitting the detailed information using multiple-input multiple-output (MIMO) beamforming; and
means for if the transmission distance for the detailed data is shorter than a predetermined distance, transmitting the detailed information using MIMO to increase a number of data streams in a unicast link.

21. The apparatus of claim 15, wherein the common information is smaller in size than the detailed information.

22. A non-transitory computer-readable medium stored with instructions for vehicle-to-vehicle communication, the instructions causing a vehicle to:
receive sensor data from one or more sensors;
categorize the sensor data into common information and detailed information;
broadcast the common information to at least one vehicle in a vehicle-to-vehicle (V2V) network, the common information indicating the availability of the detailed information;
determine that at least one portion of the detailed information is desired by the at least one vehicle; and
transmit the at least one portion of the detailed information to the at least one vehicle.

23. The non-transitory computer-readable medium of claim 22, wherein the detailed information comprises at least one of heading data, speed data, geolocation data, gyroscopic data, accelerometer data, proximity data of obstacles, image data, or video data.

24. The non-transitory computer-readable medium of claim 22, wherein, to broadcast the common information, the instructions further cause the vehicle to:
indicate desired detailed information generated by one or more sensors of the at least one vehicle in the V2V network.

25. The non-transitory computer-readable medium of claim 22, wherein the instructions further cause the vehicle to:
receive, from the at least one vehicle in the V2V network desiring the detailed information, a message indicating which portions of the detailed information are desired.

26. The non-transitory computer-readable medium of claim 25, wherein the instructions further cause the vehicle to:
determine a number of vehicles requesting detailed data;
determine if a unicast or multicast message is sent, based on the number of vehicles requesting the detailed data;
send a unicast message if the number of vehicles requesting the detailed data is smaller than a predetermined number; and
send a multicast message if the number of vehicles requesting the detailed data is larger than a predetermined number.

27. The non-transitory computer-readable medium of claim 26, wherein the instructions further cause the vehicle to:
determine a transmission distance for the detailed information;
if the transmission distance for the detailed information is longer than a predetermined distance, transmit the detailed information using multiple-input multiple-output (MIMO) beamforming; and
if the transmission distance for the detailed data is shorter than a predetermined distance, transmit the detailed information using MIMO to increase a number of data streams in a unicast link.

28. The non-transitory computer-readable medium of claim 22, wherein the common information is smaller in size than the detailed information.

* * * * *